Dec. 15, 1959   J. F. RAMSAY   2,917,740
RADIO BEACONS
Filed June 15, 1953   3 Sheets-Sheet 1
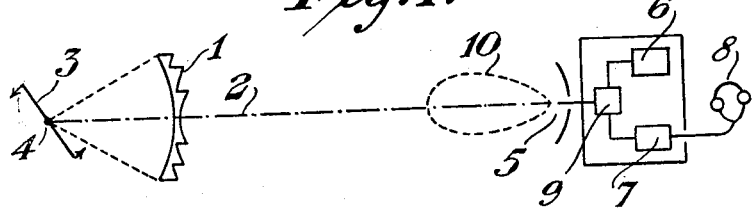
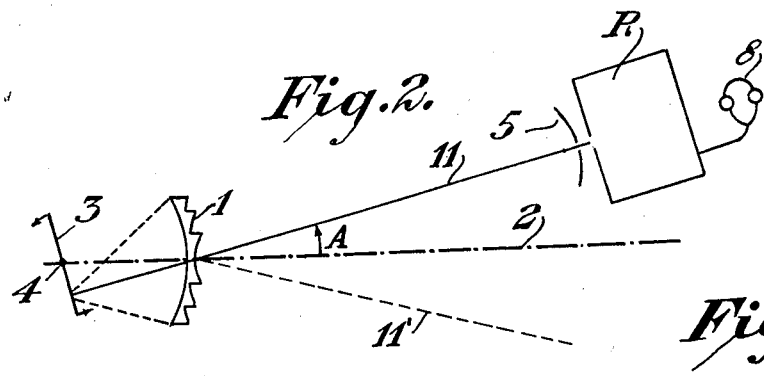
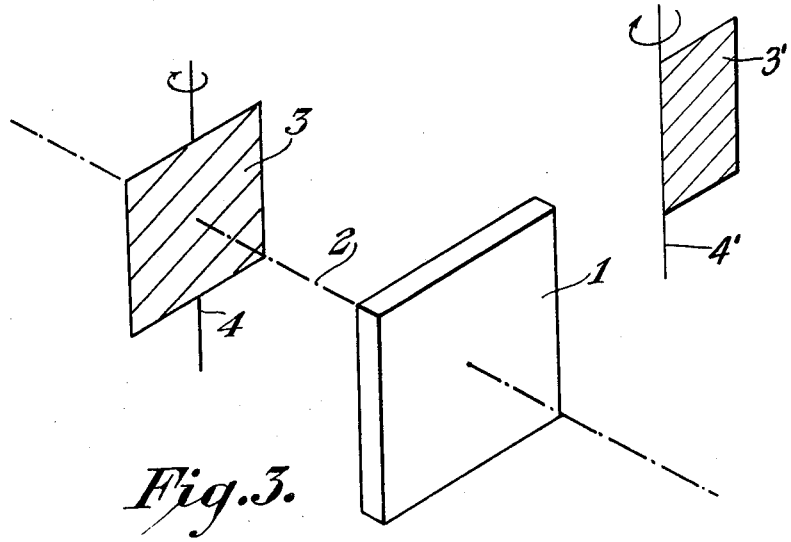
Inventor:
John Forrest Ramsay;
By his attorneys,
Baldwin & Wight Dec. 15, 1959  J. F. RAMSAY  2,917,740
RADIO BEACONS
Filed June 15, 1953  3 Sheets-Sheet 2
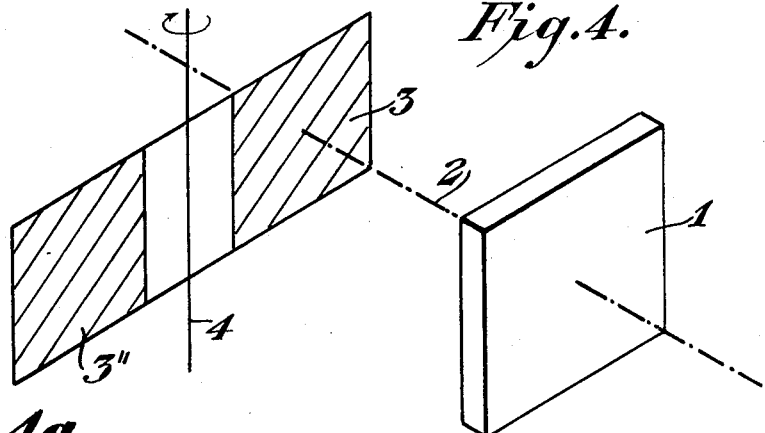
*Fig.4.*
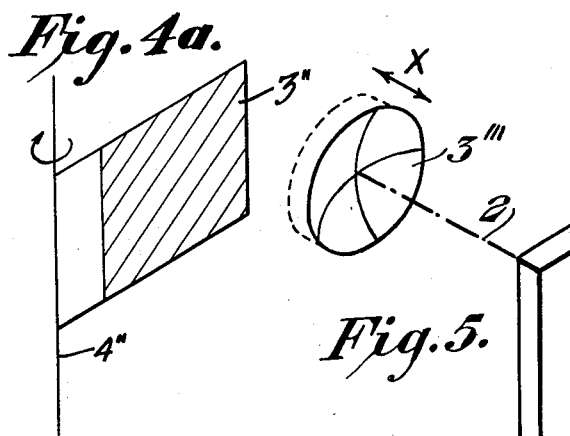
*Fig.4a.*
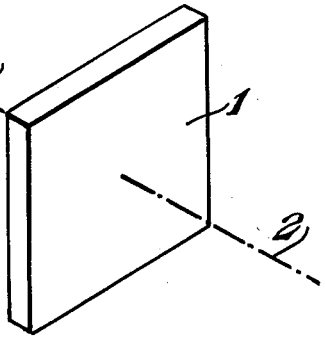
*Fig.5.*
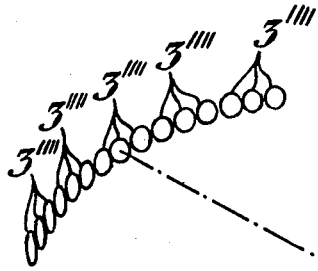
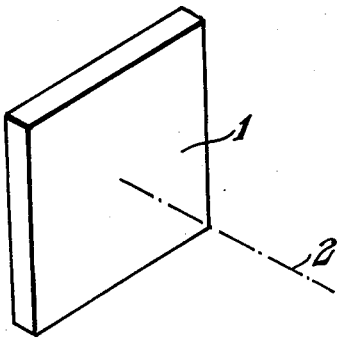
*Fig.6.*
Inventor: John Forrest Ramsay;
By Baldwin & Wight, Attorneys Dec. 15, 1959     J. F. RAMSAY     2,917,740
RADIO BEACONS
Filed June 15, 1953     3 Sheets-Sheet 3

Inventor: John Forrest Ramsay,
By his attorneys,
Baldwin & Wight

United States Patent Office 2,917,740
Patented Dec. 15, 1959

2,917,740

RADIO BEACONS

John Forrest Ramsay, Great Baddow, England, assignor to Marconi's Wireless Telegraph Company Limited, London, England, a company of Great Britain Application June 15, 1953, Serial No. 361,770

Claims priority, application Great Britain June 25, 1952

15 Claims. (Cl. 343—111)

This invention relates to radio beacons and has for its object to provide an improved and simple radio beacon for navigation aiding purposes whereby a mobile craft carrying an extremely simple radar installation may obtain directional information.

Most known navigation aiding radio beacon systems involve considerable complexity in the beacon and/or in co-operating interrogating radio apparatus carried by a co-operating mobile craft in order that the craft may obtain accurate directional information. As will be seen later the present invention provides radio beacons none of which are complex and the preferred embodiments of which are exceedingly simple and which are such that accurate directional information can be obtained by a mobile craft equipped with only a simple radar set. With certain forms of beacon in accordance with this invention the radar set may be a simple set of the C. W. Doppler type, that is to say a radar set which transmits continuous waves and is able to detect any Doppler frequency shift in the reflected waves. With other forms of beacon in accordance with this invention the radar set may be a simple set of any type able to detect amplitude modulation. Beacons in accordance with this invention may, if desired, be arranged to provide, in addition, for intelligence communication with a craft carrying an appropriately designed radar set.

According to this invention a radio beacon comprises a wide angle aperture element (such as a radio lens or a mirror) and in the focal region of said element a radio wave modulator-reflector arrangement adapted to modulate and reflect back through said element radio energy which reaches it therethrough the modulation imposed being dependent upon the angle between the incoming signal direction and the axis of the element.

In the case of a beacon for co-operation with a radar set of the C.W. Doppler type the modulator-reflector is mechanically moved and arranged to impart to the reflected energy a frequency shift which is dependent upon the modulator-reflector movement and upon the angle between the incoming signal direction and the axis of the element. In the case of a beacon for co-operation with an amplitude detecting radar set the modulator-reflector arrangement is arranged to provide amplitude modulation. In either case keying means may be provided to allow the beacon to be used also for signalling when required.

In one simple form of the invention there is employed a wide angle so-called scanning lens of known type in the focal region of which is mounted a mirror which is arranged to rotate about an axis at right angles to the axis of the lens. The mirror may be a full mirror with the axis of rotation passing through its middle line i.e. with equal mirror areas on both sides of said axis or it may be what is herein termed a half mirror i.e. a mirror with the axis of rotation down one edge. Again the mirror, whether of the half mirror or the full mirror type, may be moved about an axis which is offset with respect to the axis of the lens.

In place of using a rotating mirror a vibrating mirror or a set of vibrating mirrors may be used. For example, there may be a vibrating spheroidally curved mirror with its concave spheroidal face towards the lens and its axis coincident with the axis of said lens, the direction of vibration, which may be at audio frequency being parallel to that axis. Again there may be a large plurality of small vibrating mirrors independently vibrated at different audio frequencies and arranged on a suitable imaginary surface—for example a spheroidally curved surface with its axis coincident with the axis of the lens—the indivdual mirrors introducing by virtue of their different vibration frequencies, different Doppler frequency shifts in reflecting any wave incident thereon, the amount of the shift depending upon the particular mirror which reflects the wave and therefore upon the incoming signal direction.

The embodiments above generally described produce phase or frequency modulation of incident radio energy (fundamentally these forms of modulation are the same) and therefore are intended for co-operation with radar sets of the C.W. Doppler type. It may, however, be preferred to use amplitude modulation, especially at relatively longer wave lengths, and a number of embodiments adapted for co-operation with a radar set having an amplitude modulation receiver will now be described.

In one such embodiment there is mounted in the focal region of a wide angle so-called scanning lens a mirror e.g. a spheroidal mirror which is rotated about an axis coincident with the lens axis and having discrete areas out of the general surface of the mirror, said areas being disposed over the mirror in such manner that, when the mirror is rotated, the number of such discrete areas which pass an incident narrow beam per unit of time depends upon the distance from the axis at which said beam is incident. Said areas may be holes or embossings and may be arranged in rings or in a spiral.

In another embodiment, instead of using a single rotating mirror as above described, there is employed a plurality of small discrete mirrors arranged on a predetermined surface e.g. a spheroidal surface and individually rotated, oscillated or vibrated at different frequencies.

In yet another embodiment there is provided in the focal region of the wide angle lens an array of dielectric rod radiators connected with wave guides each of which contains an amplitude modulator operating at a different frequency.

In the specific description which follows it will be assumed for the sake of brevity that the beacons described are required to give azimuth information. They may, however, as will be obvious later, equally well be arranged to give elevation information or both elevation and azimuth information.

The invention is illustrated in the accompanying drawings in which:

Figs. 1 and 2 are schematic diagrams of one very simple form of embodiment showing the essential parts of the beacon and a co-operating mobile installation in two different relative positions;

Fig. 3 shows an embodiment of my invention employing a full mirror rotatable about a vertical axis;

Fig. 3a is a view similar to the view shown in Fig. 3 except that a half mirror is employed rotatable about a vertical axis;

Fig. 4 illustrates the invention applied to a full mirror where symmetrical parts of the full mirror are offset from the axis of the lens;

Fig. 4a is a view similar to the view shown in Fig. 4, but showing a half mirror arranged in a position offset from a vertical axis;

Fig. 5 shows an embodiment of the invention employing a spheroidally curved mirror arranged for axial vibration;

Fig. 6 illustrates an embodiment of the invention employing a plurality of reflecting diaphragms vibrated at different frequencies;

Figures 7, 8:
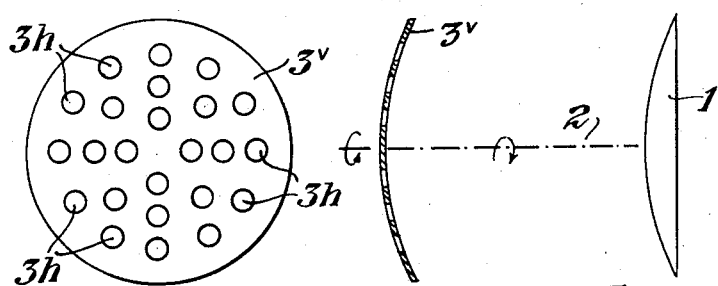
Fig. 7 is a side elevational view of a mirror arranged for operation under conditions of amplitude modulation.
Fig. 8 is a front elevational view of the mirror shown in Fig. 7.

Referring to Fig. 1 the radio beacon therein represented comprises a wide angle so-called scanning lens 1 of known type the axis of which is represented by the chain line 2 and which has in its focal region a rotating mirror 3 which is rotated about an axis 4 which is on and at right angles to the axis 2 of the lens and at the focus thereof. A mobile installation for co-operating with this simple beacon may consist merely of a C.W. Doppler type radar set having an aerial 5 energized by a C.W. transmitter 6 and equipped with a C.W. receiver 7 feeding into head phones or other indicator means 8. The transmitter and receiver units 6 and 7 are associated with the aerial through the customary transmit-receiver (T.R.) box 9. The radar set is made of suitable directivity as indicated by the dotted polar diagram 10. Such a radar set is well known per se and is probably the simplest form of radar set yet known. It is carried, as stated, upon the aircraft, ship or other vehicle which is to use the beacon.

Fig. 2 represents the same apparatus as Fig. 1 but the polar diagram 10 is not shown and the radar set is represented simply by the rectangle R, the headphones 8 and the aerial 5. The differences between Figs. 1 and 2 are merely that the mirror 3 is shown in a slightly different position in the two figures and that in Fig. 2 the axis 11 of the radar set is inclined at an angle A to the axis 2 of the lens 1 whereas in Fig. 1 the two axes are coincident i.e. in Fig. 1 the mobile craft is "on course" whereas in Fig. 1 it is "off course."

With this arrangement if the mobile craft is on course i.e. in a position such as that shown in Fig. 1, the wave reflected back to the radar set by the beacon will be of the same frequency as the wave transmitted from the radar set though it will have a low frequency amplitude modulation determined by the rate of rotation of the mirror 3. This low frequency amplitude modulation will be heard in the headphones 8 and will serve as an indication of the presence of the beacon. If, however, the radar set is in an off course position as in Fig. 2 the focal spot on the mirror 3 will be off centre and incident at a small region of the mirror which is moving with a linear velocity determined by the rate of revolution of the mirror and the distance of the said spot off center. The motion of the mirror will thus produce a Doppler frequency shift in the reflected echo wave and this will appear as a Doppler tone in the headphones 8 modulated at twice the rotation frequency of the mirror since there will be two "strikes" on the focal spot for each revolution of the mirror. A similar Doppler tone will be head if the mobile craft is equally off course on the other side of the axis 2 i.e. if the axis of the radar set is as indicated by the broken line 11' in Fig. 2. It will be apparent that as the radar set moves more and more off course a rising Doppler tone will be heard, this tone reaching a maximum when the incident wave through the lens 1 strikes near the edge of the mirror 3. It is, therefore, possible to navigate a craft back on course by directing its head so as to reduce the Doppler tone frequency, until zero Doppler frequency is reached.

The installation as so far described is such as to enable the beacon to be used for homing purposes since the navigator will always be informed which way to turn to get on course by noting whether the Doppler tone rises or falls in frequency for an alteration of course. However, if the radar set is off course the navigator is not informed how much it is off course nor even directly which side of the beacon axis he is though he can ascertain the latter fact by observing whether a change to port or starboard produces a rise or fall in the Doppler frequency. Since, however (apart from the change in Doppler note produced by an alteration of course) a receiver at axis 11 or 11' of Fig. 2 obtains the same result there is a measure of ambiguity about the system.

This ambiguity may be removed by rotating the mirror about an axis which does not pass through the focus as in Figs. 1 and 2 but through a point just beyond the focal arc used. If this is done the Doppler shift in the echo wave received by a radar set which is on course will no longer be zero but will have a finite value dependent upon design details. Being off course to one side of the beacon axis will produce a Doppler tone above this finite value and being off course on the other side will produce a Doppler tone below it. By providing the radar set with a reference frequency source e.g. a power supply frequency normally available, and comparing the received Doppler tone with the reference frequency, it is possible to tell directly on which side of the on course direction the radar set is and (by calibration and the use of a frequency meter for the received Doppler tone) how much off course the radar set is.

An incidental but practical advantage of this type of arrangement is that clear higher frequency tones are provided on all azimuths these tones being modulated of course by the repetition frequency associated with the rotation.

Figs. 3 to 6 inclusive show purely schematically various forms of mirror arrangements which may be used in the beacon. In Fig. 3 the lens is represented at 1 and the axis of rotation of the mirror 3 at 4, the axis of the beacon being as before indicated by the chain line 2. Fig. 3 shows an arrangement of rectangular mirror that rotates about its own center line on axis 4— i.e. a full mirror is used. Fig. 3a shows an arrangement of half mirror 3' which is arranged to rotate about one edge which is in the axis 4'. The full mirror arrangement of Fig. 3 is preferred over the half mirror arrangement of Fig. 3a since it gives better inherent balancing and the repetition frequency is twice that obtained when a half mirror is used. In Fig. 4 the axis of the mirror, which again may be a full mirror as shown at 3 and 3'', or a half mirror as shown in Fig. 4a, is offset from the axis of the lens shown at 4 in Fig. 4 and 4'' in Fig. 4a. If this is done finite Doppler tones are obtained whether the radar set is on course or not, a definite reference tone being obtained when the radar set is on course. This offsetting of the mirror therefore provides a means of avoiding the ambiguity previously referred to.

It is not necessary that the reflector system employed be either a single mirror or a rotated mirror for an oscillated or a vibrated mirror may be used and a plurality of differently vibrated mirrors may be used in place of a single mirror.

Fig. 5 shows an arrangement with a spheroidally curved mirror 3''' which is axially vibrated as indicated by the double headed arrow X with an amplitude indicated by the broken lines behind the mirror. With this arrangement, since the component of vibration obtained along the direction of arrival of a wave decreases with increase of the angle between said wave and the axis 2 of the lens, the Doppler note obtained by a co-operating radar set will be of maximum frequency when that set is on course and will fall away as the off course angle increases.

Fig. 6 shows an arrangement in which a plurality of reflecting diaphragms vibrated at different tone or voice frequencies is employed. For the sake of simplicity only one row of diaphragms 3''' is shown in Fig. 6 those being arranged on what may be termed the "scanning arc" of the lens 1. In practice there may be a plurality of similar rows of diaphragms or such diaphragms may be arranged over an imaginary focal surface. The frequency of vibration of the different diaphragms is differently selected so that the Doppler shift superimposed on a reflected wave by diaphragm vibration depends upon the particular diaphragm on which the ray falls i.e. upon the incoming signal direction. By suitably choosing different diaphragm vibration frequencies and the number of diaphragms provided, a high degree of resolution of off course indicated may be obtained and a co-operating radar set which is suitably equipped to receive, separate, and measure the Doppler shift can obtain accurate information as to its bearing with regard to the beacon.

In some cases there may be loss in echoing area at what may be termed the edges of the scan i.e. for a signal direction widely off course. If desired compensation for the effect of such loss in echoing area may be obtained by providing suitable tone correction circuits in the radar receiver for example by providing the audio amplifier of the receiver with a rising frequency characteristic for the case in which the beacon is one which gives a rising Doppler frequency for increasing angle off course.

The form of indication given by the radar set may take any of a variety of different forms. In the simplest form it is merely a pair of telephone receivers 8 as already described, though where the shift frequency is required to be measured a frequency meter of any suitable type may be used. Again the indicator may be a cathode ray tube e.g. one in which the spectrum of the Doppler tone is displayed on an X axis of frequency and a Y axis of amplitude. An example of how a cathode ray tube may be applied to this use is shown in Fig. 2 of Wolff Patent 2,433,804, dated December 30, 1947. In such a case an aircraft or ship may be steered on course by adopting a course which moves the spectrum on the cathode ray tube to a reference mark on the frequency axis. The wide angle aperture element is preferably a lens 1 or mirror of simple form but where desired more complex forms such as a highly corrected lens system as in a wide angle camera may be used. Said aperture element may include mirrors for example to reduce beacon depth or polarized mirrors to split the focus. It might also be constituted by some form of zone plate.

The reflector arrangements employed may be mechanical or electro-mechanical as already described. They may also be entirely electrical in operation making use of shorted phase shifters for example employing gases or solids subjected to and responsive to applied modulating fields. In all cases the object is to introduce a Doppler shift which is dependent upon and therefore an indication of incoming signal direction with relation to a predetermined direction.

The illustrated embodiments so far described are adapted for use with C.W. Doppler type radar sets.

Fig. 7 is a schematic side elevation of and Fig. 8 a face view of the mirror of an embodiment giving amplitude modulation. The wide angle lens is represented at 1 and in its focal region is a preferably spheroidal mirror 3$^v$ which is rotated about the common axis 2 and has small holes 3$h$. As shown the holes are in rings (they might be in a suitable spiral). The radial spacing is about one focal spot width and the circumferential spacing about two focal spot widths. Each hole provides a discrete area out of the general mirror plane and since the numbers of holes in the different rings is different, an incident wave will be amplitude modulated at a frequency dependent upon the ring it strikes and which is different for each ring. In place of using holes to produce the amplitude modulation upstanding areas, i.e. embossings, could be used. Amplitude modulation is obtained by the action of the holes or embossings, as the case may be in defocussing the beam.

Figure 9:
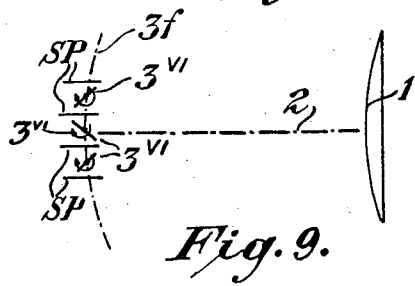
Fig. 9 illustrates a modified form of amplitude modulating mirror arrangement which may be used in the system of my invention.

Fig. 9 shows another amplitude modulating embodiment. Again the lens is indicated at 1 but instead of using a single mirror there is a large number of discrete mirrors 3$^{VI}$ (so as not to complicate the drawing only three are shown) each rotated at a different speed about an axis at right angles to the axis 2 as indicated by the curved arrows. The centers of rotation are on any imaginary focal surface represented by the chain line 3$f$. Each mirror is, as it were, in a small "cell" constituted by shield plates SP. The size of the mirrors and their spacing in the scanning direction is preferably about 1 focal spot width. Instead of being rotated the mirrors may be oscillated or vibrated. Their action is, of course, to "chop" or amplitude modulate incident energy at their own individual frequencies.

Figure 10:
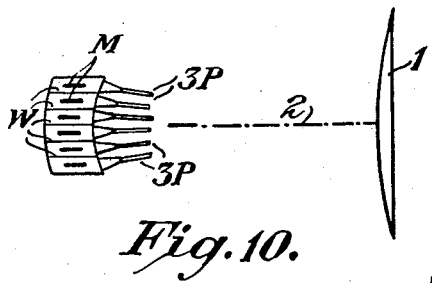
Fig. 10 shows a further modification of the system of my invention employing an array of dielectric rod radiators each feeding a wave guide.

In the modification represented in Fig. 10 there is provided in the focal region of the lens 1 an array of dielectric rod radiators consisting of dielectric rods 3P each feeding a wave guide W in which is a suitable amplitude modulator represented schematically by the line marked M and each operated by any known means (not shown) to produce amplitude modulation at its own characteristic frequency.

Figure 11:
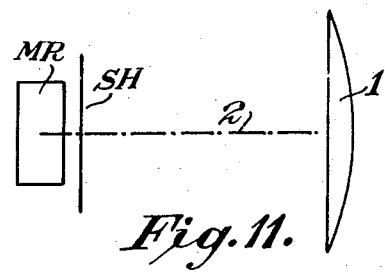
Fig. 11 illustrates an embodiment of the invention as applied to an interrogating radar system.
Figure 12:
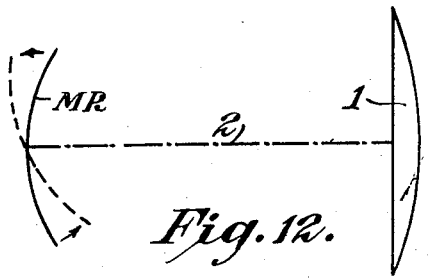
Fig. 12 is a view similar to Fig. 11, illustrating the manner in which the mirror is displaced in the arrangement shown in Fig. 11 for signalling.

Figs. 11 and 12 are schematic diagrams of arrangements which may be employed in cases where it may be required to signal, from the beacon, to an "interrogating" radar (not shown). In both figures the wide angle lens is represented at 1. In Fig. 11 a modulator-reflector, of any of the types hereinbefore described (phase or amplitude) is indicated by the block MR and between it and the lens 1 is a keyed shutter represented by the line SH. Only when the shutter is open an interrogating radar will receive an echo. The shutter may, therefore, be keyed, for example in Morse code, to signal to the interrogating radar. In the arrangement in Fig. 12 the reflector MR is assumed to be a spherical mirror, and is pivoted after the manner of the reflector in a signalling lamp so that it can be swung from its normal position (shown in full line) to the position shown in broken lines. By keying the mirror between the positions shown e.g. in Morse code, the beacon may be used for intelligence signalling.

Beacons in accordance with this invention may of course be rotated as a whole and/or may be mounted in clusters or arrays as may be desired. Energy for driving the mirrors or mirror systems may be derived in any convenient manner, e.g. in the case of fully unattended beacons, wind driven generators may be used as a source of driving power.

While I have described my invention in certain preferred embodiments it is realized that further modifications may be made and I desire that it be understood that no limitations upon my invention are intended other than may be imposed by the scope of the appended claims.

I claim:

1. A radio beacon comprising a wide angle aperture element whereby a focal region is formed, a reflecting element, said reflecting element being arranged in the focal region of said wide angle aperture element, said modulator-reflector being adapted to modulate and reflect back through said element radio energy which reaches it therethrough, means to vary the spatial relation of said modulator-reflector with respect to the axis of said element whereby frequency modulation imposed on the radio energy produces a modulation which varies with the angle between the incoming signal direction and the axis of the element.

2. A beacon as set forth in claim 1 wherein mechanical means are provided for moving the said reflecting element with respect to the axis of said wide angle aperture element and adapted to impart to the reflected energy a frequency shift which is dependent upon the modulator-reflector movement and upon the angle between the incoming signal direction and the axis of the element.

3. A beacon as set forth in claim 1 wherein the modulator-reflector arrangement is adapted to produce amplitude modulation at a frequency characteristic of the angle between the incoming signal direction and the axis of the element.

4. A beacon as set forth in claim 1 wherein the modulator-reflector arrangement is mechanically moved and arranged to impart to the reflected energy a frequency shift which is dependent upon the modulator-reflector movement and upon the angle between the incoming signal direction and the axis of the element said modulator-reflector arrangement consisting of a mirror which is moved about an axis at right angles to the axis of the lens.

5. A beacon as set forth in claim 1 wherein the modulator-reflector arrangement is mechanically moved and arranged to impart to the reflected energy a frequency shift which is dependent upon the modulation-reflector movement and upon the angle between the incoming signal direction and the axis of the element, said modulator-reflector arrangement consisting of a mirror which is moved about an axis at right angles to the axis of the lens said axis passing through the middle line of said mirror to leave equal mirror areas on both sides of the axis.

6. A beacon as set forth in claim 1 wherein the modulator-reflector arrangement is mechanically moved and arranged to impart to the reflected energy a frequency shift which is dependent upon the modulator-reflector movement and upon the angle between the incoming signal direction and the axis of the element, said modulator-reflector arrangement consisting of a mirror which is moved about an axis at right angles to the axis of the lens said axis passing through one edge of said mirror to leave the whole area of said mirror on one side of the axis.

7. A beacon as set forth in claim 1 wherein the modulator-reflector arrangement is mechanically moved and arranged to impart to the reflected energy a frequency shift which is dependent upon the modulator-reflector movement and upon the angle between the incoming signal direction and the axis of the element, said modulator-reflector arrangement consisting of a mirror which is moved about an axis at right angles to the axis of the lens, said axis being offset with respect to the axis of the aperture element.

8. A beacon as set forth in claim 1 wherein the modulator-reflector arrangement is mechanically moved and arranged to impart to the reflected energy a frequency shift which is dependent upon the modulator-reflector movement and upon the angle between the incoming signal direction and the axis of the element, said modulator-reflector arrangement consisting of a plurality of small vibrating mirrors independently vibrated at different audio frequencies and arranged on an imaginary surface having an axis coincident with the axis of the wide aperture element.

9. A beacon as set forth in claim 1 wherein the modulator-reflector arrangement is adapted to produce amplitude modulation at a frequency characteristic of the angle between the incoming signal direction and the axis of the element, said modulator-reflector arrangement consisting of a mirror which is rotated about an axis coincident with the axis of the aperture element and has discrete areas out of the general surface of the mirror, said areas being disposed over the mirror in such manner that, when the mirror is rotated, the number of such discrete areas which pass an incident narrow beam per unit of time depends upon the distance from the axis at which said beam is incident.

10. A beacon as set forth in claim 1 wherein the modulator-reflector arrangement is adapted to produce amplitude modulation at a frequency characteristic of the angle between the incoming signal direction and the axis of the element, said modulator-reflector arrangement comprising an array of dielectric rod radiators connected with wave guides each of which contains an amplitude modulator operating at a different frequency.

11. A beacon as set forth in claim 1 and comprising keying means for keying the beacon in accordance with desired signals by keying energy reflected thereby.

12. A radio beacon comprising a wide angle aperture element whereby a focal region is formed and in the focal region at least one radio wave modulator-reflector is arranged with respect to said element, said modulator-reflector being rotatable about an axis substantially at right angles to the axis of said element so as to frequency modulate and reflect back through said element radio energy which reaches it therethrough, whereby the frequency modulation imposed on the radio energy is dependent upon the angle between the incoming signal direction and the axis of the element.

13. A radio beacon comprising a wide angle aperture element whereby a focal region is formed and in the focal region at least one radio wave modulator-reflector is arranged with respect to said element, said modulator-reflector consisting of a plurality of small vibrating mirrors independently vibrated at different audio frequencies and arranged on an imaginary surface having an axis coincident with the axis of the wide aperture element so as to frequency modulate and reflect back through said element radio energy which reaches it therethrough, whereby the frequency modulation imposed on the radio energy is dependent upon the angle between the incoming signal direction and the axis of the element.

14. A radio beacon comprising a wide angle aperture element whereby a focal region is formed and in the focal region at least one radio wave modulator-reflector is arranged with respect to said element, said modulator-reflector consisting of a mirror which is rotated about an axis coincident with the axis of the aperture element and has discrete areas out of the general surface of the mirror, said areas being disposed over the mirror in such manner that, when the mirror is rotated, the number of such discrete areas which pass an incident narrow beam per unit of time depends upon the distance from the axis at which said beam is incident, so as to frequency modulate and reflect back through said element radio energy which reaches it therethrough, whereby the frequency modulation imposed on the radio energy is dependent upon the angle between the incoming signal direction and the axis of the element.

15. A radio beacon comprising a wide angle aperture element whereby a focal region is formed and in the focal region at least one radio wave modulator-reflector is arranged with respect to said element, said modulator-reflector comprising an array of dielectric rod radiators connected with wave guides each of which contains a phase modulator operating at a different frequency so as to frequency modulate and reflect back through said element radio energy which reaches it therethrough whereby the frequency modulation imposed on the radio energy is dependent upon the angle between the incoming signal direction and the axis of the element.

References Cited in the file of this patent

UNITED STATES PATENTS

| | | |
|---|---|---|
| 2,432,984 | Budenbom | Dec. 23, 1947 |
| 2,443,643 | Schelleng | June 22, 1948 |
| 2,472,782 | Albersheim | June 14, 1949 |
| 2,557,979 | Labin | June 26, 1951 |

FOREIGN PATENTS

| | | |
|---|---|---|
| 654,734 | Great Britain | June 27, 1951 |
| 684,300 | Great Britain | Dec. 17, 1952 |
| 694,523 | Germany | Aug. 2, 1940 |